United States Patent
Gallet (10) Patent No.: US 8,986,146 B2
(45) Date of Patent: Mar. 24, 2015

(54) REDUCTION GEAR WITH EPICYCLIC GEAR TRAIN HAVING ROLLER-BEARING-MOUNTED PLANET SPINDLES

(71) Applicant: SNECMA, Paris (FR)

(72) Inventor: Francois Gallet, Moissy-Cramayel Cedex (FR)

(73) Assignee: SNECMA, Paris (FR)

( * ) Notice: Subject to any disclaimer, the term of this patent is extended or adjusted under 35 U.S.C. 154(b) by 10 days.

(21) Appl. No.: 13/904,483

(22) Filed: May 29, 2013

(65) Prior Publication Data
US 2013/0324343 A1 Dec. 5, 2013

(30) Foreign Application Priority Data

May 30, 2012 (FR) .................................... 12 55000

(51) Int. Cl.
| | | |
|---|---|---|
| *F16H 47/08* | (2006.01) | |
| *F02C 7/36* | (2006.01) | |
| *F02C 3/107* | (2006.01) | |
| *F16H 57/08* | (2006.01) | |
| *F16H 3/44* | (2006.01) | |
| *F02K 3/06* | (2006.01) | |

(52) U.S. Cl.
CPC . *F02C 7/36* (2013.01); *F02C 3/107* (2013.01); *F16H 57/082* (2013.01); *F16H 3/44* (2013.01); *F02K 3/06* (2013.01); *F16H 2057/085* (2013.01); *F05D 2260/4031* (2013.01); *Y02T 50/671* (2013.01)
USPC ............. 475/96; 475/233; 475/305; 475/348; 192/82 T (58) Field of Classification Search
CPC ............. F16H 3/44; F16H 1/28; F16H 57/08; F02C 7/36

USPC ........... 475/96, 233, 305, 331, 348; 192/82 T
See application file for complete search history.

(56) References Cited

U.S. PATENT DOCUMENTS

| | | | | |
|---|---|---|---|---|
| 5,127,503 A | * | 7/1992 | Gratzer ...................... 192/58.42 |
| 5,156,579 A | * | 10/1992 | Wakuta et al. ................. 475/161 |
| 5,391,125 A | * | 2/1995 | Turra et al. ..................... 475/346 |
| 6,155,126 A | * | 12/2000 | Vogt et al. ........................ 74/335 |
| 2002/0069637 A1 | * | 6/2002 | Becquerelle et al. ......... 60/226.1 |
| 2011/0206498 A1 | | 8/2011 | McCooey |

FOREIGN PATENT DOCUMENTS

| | | |
|---|---|---|
| DE | 10 2010 032 252 A1 | 1/2012 |
| DE | 10 2010 032 253 A1 | 1/2012 |
| EP | 2 360 391 A1 | 8/2011 |

OTHER PUBLICATIONS

U.S. Appl. No. 13/773,811, filed Feb. 22, 2013, Gallet, et al.
French Preliminary Search Report and Written Opinion of the International Searching Authority issued Mar. 18, 2013, in Patent Application No. FR 1255000, filed May 30, 2012 (with English Translation of Category of Cited Documents).

* cited by examiner

*Primary Examiner* — Michael Mansen
*Assistant Examiner* — Tinh Dang
(74) *Attorney, Agent, or Firm* — Oblon, McClelland, Maier & Neustadt, L.L.P.

(57) ABSTRACT

A reduction gear with epicyclic gear train including an annulus gear, and at least one planet gear rolling on the annulus gear and able to rotate about a planet spindle borne by a planet carrier is provided. The planet spindle is mounted such that it can itself rotate about its axis relative to the planet carrier. The reduction gear is suitable for mounting in a high bypass ratio jet engine for driving the fan thereof.

10 Claims, 5 Drawing Sheets

REDUCTION GEAR WITH EPICYCLIC GEAR TRAIN HAVING ROLLER-BEARING-MOUNTED PLANET SPINDLES

BACKGROUND OF THE INVENTION

The present invention relates to the field of aeronautical propulsion and, more particularly, to the field of high bypass ratio dual-flow jet engines, or turbofans.

Modern turbomachines conventionally take the form of an assembly of modules which may comprise stationary and moving parts. A module is defined as a subassembly of a turbomachine having geometric features at the level of its interfaces with the adjacent modules, which features are sufficiently precise for the subassembly to be delivered individually, and having undergone an individual balancing when it comprises rotating parts. Assembling the modules makes it possible to build up a complete engine, by reducing as far as possible the operations of balancing and pairing the interfacing parts.

Current turbofans comprise a plurality of compressor stages, in particular a low-pressure (LP) compressor and a high-pressure (HP) compressor which form part of the primary body of the engine. A large wheel of moving blades, also known as the fan, is located upstream of the low-pressure compressor. This fan supplies both the primary flow, which passes through the LP and HP compressors, and the cold flow—also known as the secondary flow—which is immediately directed toward a cold flow duct known as the secondary duct. The fan is driven by the rotating shaft of the LP spool and generally rotates at the same speed as the latter. It can, however, be of interest to make the fan rotate more slowly than the LP shaft, especially when the fan is very large, in order to achieve better aerodynamic design. To this end, a reduction gear is arranged between the LP shaft and a fan shaft bearing the fan. The fan, the fan shaft and the reduction gear generally form one module, called the fan module.

DESCRIPTION OF THE PRIOR ART

The types of reduction gears used include reduction gears with an epicyclic gear train which offer the advantage of having large reduction ratios for reducing the speed of rotation, while minimizing space requirements. These reduction gears are characterized by planet gears which roll on an outer annulus gear by rotating about planet spindles borne by a planet carrier. For size and weight reasons, it is advantageous for the planet gears to be made to rotate on their spindles via the intermediary of journal bearings. These bearings require excellent lubrication, lest they seize and cause the reduction gear to lock up, with all the consequences that can have for the operation of the engine and the safety of the aircraft. They thus present difficulties in terms of operational reliability, and therefore require precautionary measures to be taken to prevent a breakdown such as degradation of the bearing or untimely in-flight engine shutdown.

One of the solutions provided has been to introduce into the engine a pump dedicated to the operation of the reduction gear, in order that the reduction gear can always be lubricated, even when the HP spool of the jet engine is stopped. In this case, it is necessary to add a power take-off on the fan or an electric supply circuit in order to drive this pump. The pump can also present problems in terms of size, weight and lifespan, especially because it is located at the heart of the engine and is therefore difficult to maintain. Introducing this pump therefore presents the disadvantage of making the architecture of the engine more complex and goes against the desired aim of compactness and weight reduction.

SUMMARY OF THE INVENTION

It is an aim of the present invention to provide solutions to these drawbacks by proposing a reduction gear which has journal bearings between the planet gears and their spindles, remains operational and, in particular, does not require a specific lubrication circuit in the event of a breakdown.

To that end, the invention relates to a reduction gear with epicyclic gear train comprising an annulus gear, at least one planet gear rolling on said annulus gear and able to rotate about a planet spindle borne by a planet carrier, wherein said planet spindle is mounted such that it can itself rotate about its axis relative to said planet carrier.

The fact that the planet spindles are allowed to rotate freely makes it possible to compensate for seizure of the bearings of the planet gears and to continue to function if the planet gears can no longer rotate about their spindles.

Advantageously, the planet gear rotates about its planet spindle by means of a journal bearing and the planet spindle is mounted on the planet carrier via the intermediary of a rolling bearing. As the risk of the journal bearing seizing is relatively high, having a rolling bearing ensures the reliability of the degraded mode.

The reduction gear preferably comprises two modes of operation: a first mode in which said planet spindle is rigidly attached to the planet carrier and a second mode in which said planet spindle can rotate freely relative to the planet carrier. This guarantees that the planet gear is able to rotate, even in the event that its bearing seizes.

Advantageously, switching from one mode to the other is performed as a function of the temperature of the lubrication oil of said reduction gear. This thus provides for automatic switching from one mode to the other without the need for specific devices.

In one particular embodiment, switching from one mode to the other is actuated by an actuation means positioned so as to be in contact with said lubrication oil and comprising a shape memory material.

Said actuation means is preferably a flange plate in the shape of a circular annulus, the central bore of which is attached to said spindle and the outer end of which moves in the axial direction as a function of the temperature of the lubrication oil.

More preferably, said flange plate comprises, at its outer end, at least one first face which extends in the radial direction facing a corresponding face positioned on said planet carrier, the axial positioning of said end, produced by the oil at the nominal operating temperature of the reduction gear, being designed so as to cause said two faces to press against each other. The adhesion produced by this pressure makes it possible to lock the rotation of the spindle in its planet carrier. The planet gear therefore rotates about its journal bearing.

More preferably still, said flange plate comprises at its outer end at least one second face which extends in the radial direction facing a corresponding face positioned on said planet gear, the axial positioning of said end, produced by the oil at a temperature below the nominal operating temperature of the reduction gear, being designed so as to cause said two faces to press against each other. The adhesion produced by this pressure makes it possible to lock the rotation of the planet gear relative to its journal bearing. However, the planet gear spindle can rotate freely in the planet carrier.

It should be noted that, when the flange plate is pressed tightly against the first face of the planet carrier, it will be able to act as a torque limiter in the event of a breakdown. This is because if the journal bearing were to seize, for example as a consequence of a lubrication fault, the bearing would become locked in rotation and would transmit the torque from the planet gear to the flange plate. As the capacity for uptake of this torque is limited by the coefficient of adhesion between the flange plate and the planet carrier, the spindle will in fact be able to rotate freely in the planet carrier, and the reduction gear will not be locked, thus limiting the negative consequences of this seizure.

The invention also relates to a fan module of a dual-flow jet engine comprising a fan shaft driven by a reduction gear as described hereinabove, and finally to a dual-flow jet engine comprising such a fan module.

DESCRIPTION OF THE DRAWINGS

The invention will be better understood, and other aims, details, features and advantages of the invention will appear more clearly in the following detailed explanatory description of one embodiment of the invention, given as a purely illustrative and non-limiting example, with reference to the attached schematic drawings, in which.

Figure 1:
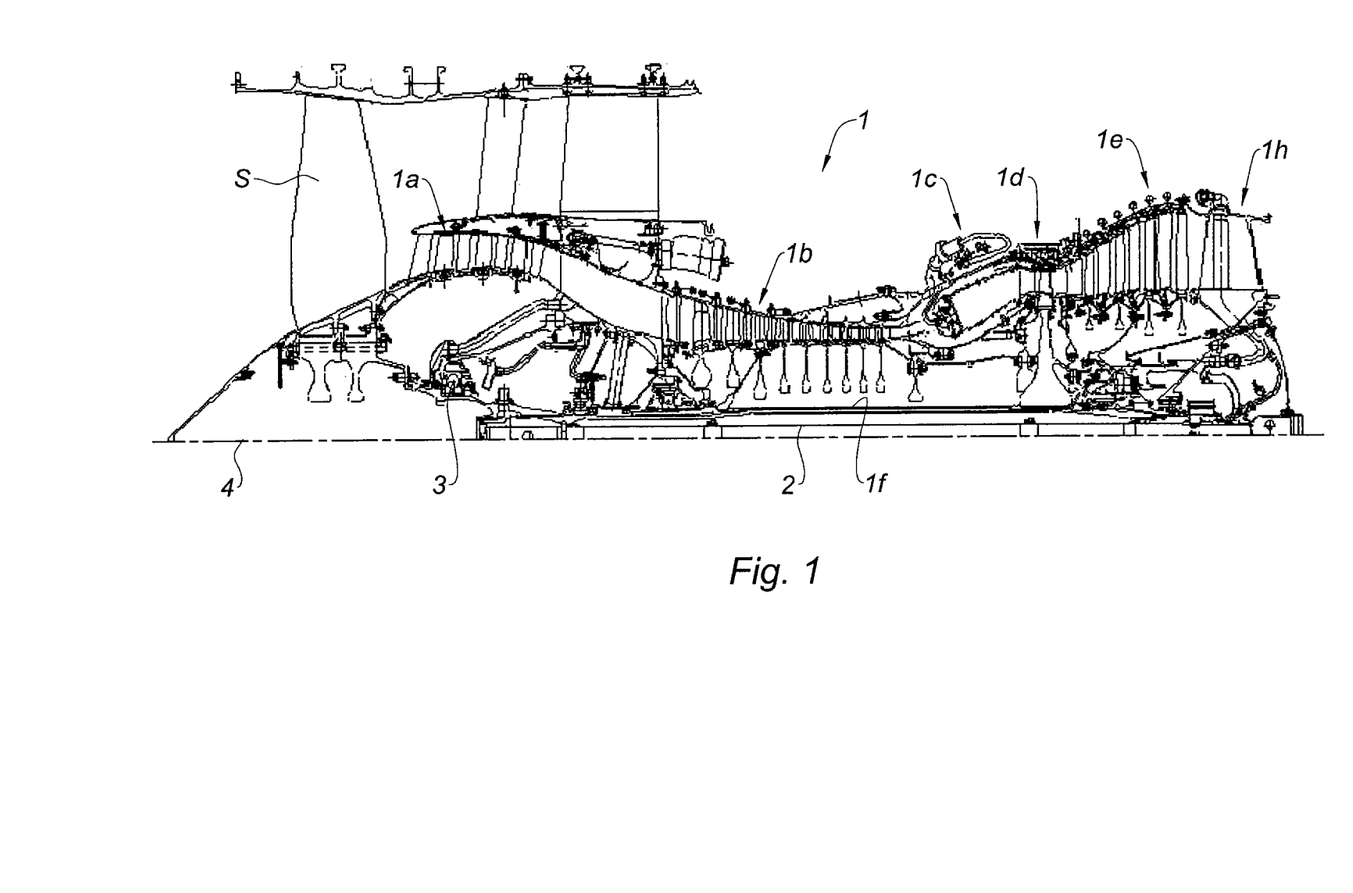
FIG. 1 is a general view of a high bypass ratio dual-flow jet engine.

FIG. 1 shows a jet engine 1 which comprises, in a conventional manner, a fan S, a low-pressure compressor 1a, a high-pressure compressor 1b, a combustion chamber 1c, a high-pressure turbine 1d, a low-pressure turbine 1e and an exhaust nozzle 1h. The high-pressure compressor 1b and the high-pressure turbine 1d are connected by a high-pressure shaft 1f and, together, these three form a high-pressure (HP) core. The low-pressure compressor 1a and the low-pressure turbine 1e are connected by a low-pressure shaft 2 and, together, these three form a low-pressure (LP) core.

In the configuration shown, which relates to a conventional turbofan without a reduction gear, the disk on which the blades of the fan S are mounted is driven by a fan shaft 3, also known as the LP journal, which is itself driven directly by the LP shaft 2. In the event that a reduction gear is placed between the LP shaft 2 and the fan shaft 3, this reduction gear is, in a known manner, a reduction gear with epicyclic gear train.

Figure 2:
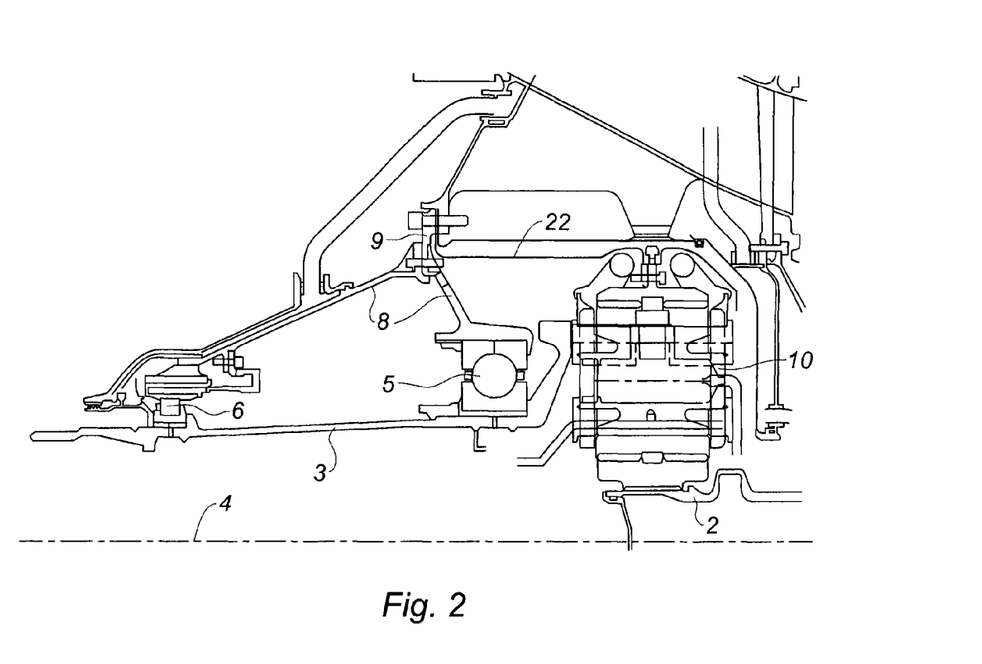
FIG. 2 is a detailed view showing the integration, in a turbofan, of a reduction gear for reducing the speed of rotation of the fan shaft, having an epicyclic gear train, according to the prior art.

FIG. 2 shows the commonly used position for installing the reduction gear 10 in the forward portion of the jet engine 1. The blades of the fan S shown in FIG. 1 are borne by the fan shaft 3 which is connected to the structure of the engine by a ball bearing 5, which transmits thrust forces, and by a roller bearing 6 which allows longitudinal expansion of the fan shaft. The bearing surfaces of these two rolling bearings are attached to one or more parts forming the support 8 for the fan shaft, which support is fastened to the structure of the jet engine at the level of a support flange of the fan module 9. The fan shaft 3, which along with the support part 8, the blades of the fan S shown in FIG. 1 and the two rolling bearings 5 and 6 belongs to the fan module, is attached at its downstream end to the planet carrier 13 shown in FIG. 3 of the reduction gear 10. For its part, the LP shaft 2 is connected to the sun gear 11 shown in FIG. 3 of the reduction gear 10 by its splines 7, as set out below with reference to FIG. 3.

The reduction gear 10 is attached, via the intermediary of closing and support flanges 20 which extend in the radial direction from the annulus gear of the epicyclic gear train, to one of the ends of a support casing 22 shown in FIG. 2, which thus ensures that the reduction gear is held in place on the fan shaft 3 and that it is correctly positioned relative to the LP shaft 2.

Figure 3:
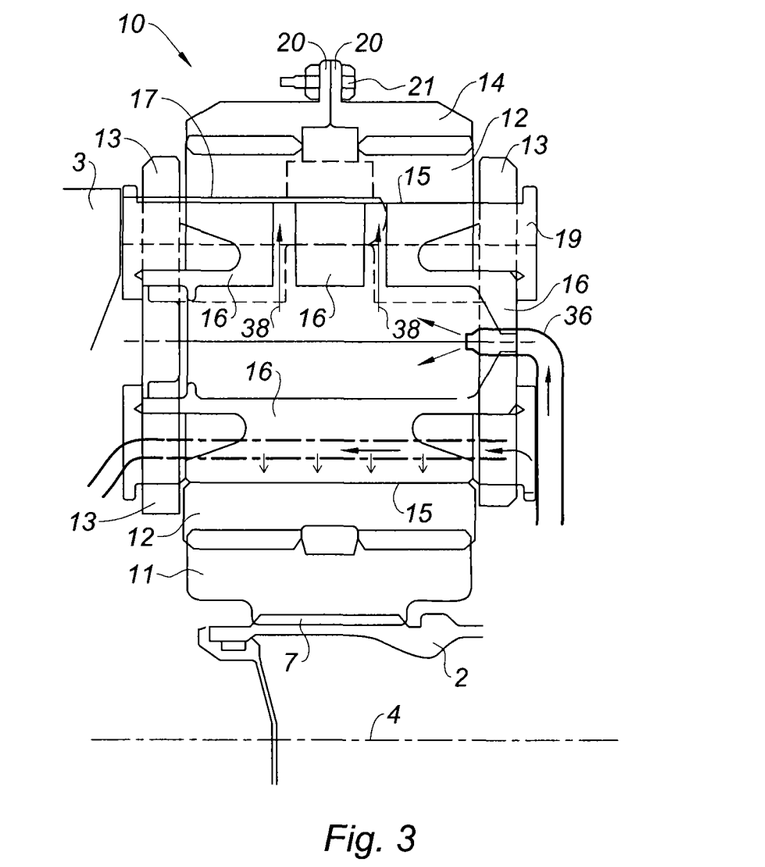
FIG. 3 is a detailed view of the reduction gear of FIG. 2.

FIG. 3 shows, in radial half section, the upper portion of a reduction gear 10 according to the prior art, the lower portion being set out symmetrically with respect to the axis of rotation 4 of the jet engine, which axis is visible at the bottom of the figure. The reduction gear 10 is enclosed on the outside in its annulus gear 14, which is not able to rotate and is attached to the structure of the engine at its closing and attachment flanges 20. The annulus gear 14 is in fact constructed in two parts in order to make it possible to fit in place all the elements making up the reduction gear and these two parts are attached to one another by a plurality of assembly bolts 21, at the level of the flanges 20 extending in the radial direction from the annulus gear. The corresponding end of the support casing 22 shown in FIG. 2 is itself also attached to the closing flanges 20 by the assembly bolts 21.

The reduction gear meshes, on one hand, with splines 7 of the LP shaft 2 via the intermediary of the gears of the sun gear 11 of the epicyclic gear train and, on the other hand, with the fan shaft 3 which is fastened to the planet carrier 13 of this same epicyclic gear train. In a conventional manner, the sun gear 11, the axis of rotation of which is the same as the axis 4 of the jet engine, drives a plurality of planet gears 12 which are regularly spaced around the circumference of the reduction gear. These planet gears 12 also rotate about the axis 4 of the jet engine by rolling on the annulus gear 14 which is attached to the structure of the jet engine by the support casing 22. A planet spindle 16, connected to a planet carrier 13, is located at the center of each planet gear which rotates freely about this spindle with the aid of a journal bearing 15, the operational reliability of which forms the subject matter of the invention. The rotation of the planet gears about their respective planet spindles 16, which occurs as a result of their gears engaging with those of the annulus gear 14, drives the planet carrier 13—and, as a consequence, the fan shaft 3 which is connected thereto—in rotation about the axis 4 at a speed of rotation which is lower that of the LP shaft 2.

The planet carrier 13 drives the fan shaft 3 by means of a plurality of centering fingers 17 which are regularly spaced on the circumference of the reduction gear and, extending in the axial direction from the downstream end of the fan shaft 3, penetrate into bores made in the planet carrier. The planet carrier 13 extends symmetrically on either side of the reduction gear so as to enclose the assembly and form an enclosure inside which a lubrication function can be implemented. Bushings 19 complete the closure of this enclosure by sealing it off at the planet spindles 16, on either side of the reduction gear.

FIG. 3 further shows the path of the lubrication oil inside the reduction gear 10. A plurality of ducts 36, which are regularly spaced on the periphery of the reduction gear and are equal in number to the planet gears 12, bring the oil into the internal enclosure of each planet spindle 16, which enclosure is enclosed by the planet carrier 13. Centrifugal force makes this oil pass into radially oriented guiding channels 38 which pass through these spindles. These channels 38 open onto the periphery of the planet spindles 16 at the journal bearings 15 which support the planet gears 12 and thus ensure the lubrication thereof.

Figure 4:
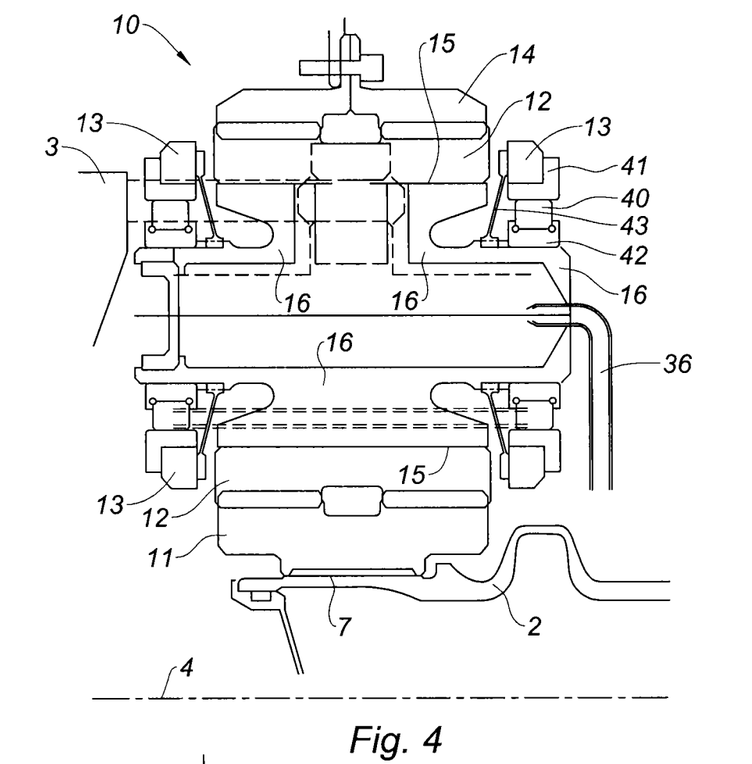
FIG. 4 is a view of a reduction gear with epicyclic gear train, according to the invention, in a normal mode of operation.

FIG. 4 shows a reduction gear according to the invention in a configuration corresponding to normal operation, with the engine being hot. The reduction gear comprises, as previously, a planet gear 12 which rotates on its planet spindle 16 via the intermediary of a journal bearing 15 which is lubricated by the guiding channels 38 shown in FIG. 3. In contrast, the planet spindle 16 is not rigidly connected to the planet carrier 13 as previously according to the prior art, but is attached thereto via the intermediary of a rotary bearing, made up of rollers 40 and two rolling bearing cages 41 and 42 which hold these rollers in place. The outer cage 41 is attached to the planet carrier 13 and the inner cage 42 is attached to the planet spindle 16 thereof. This configuration thus allows the planet carrier to turn, if necessary, about the planet spindle 16.

The invention is also characterized by putting in place an element for preventing the rotation either of the planet gear 12 or of the planet carrier 13, depending on the chosen mode of operation, these two elements being able to rotate about the planet spindle 16, as will be explained below.

Figure 5:
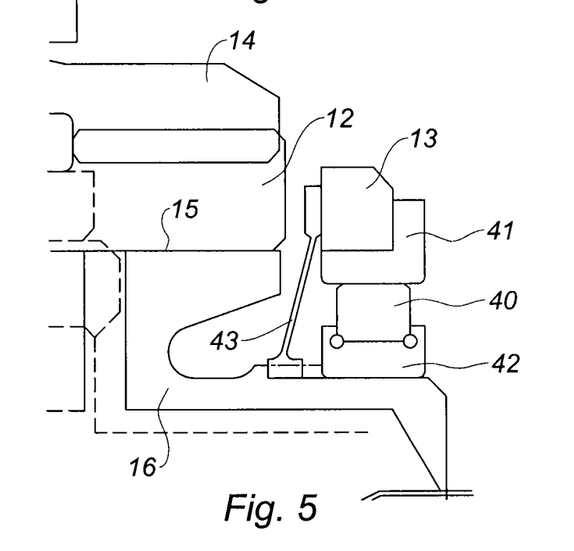
FIG. 5 is a detailed view of the reduction gear of FIG. 4.

FIGS. 4 and 5 show a flange plate 43 in the shape of a circular annulus surrounding the planet spindle 16, which is attached at its internal bore to the planet spindle and which extends in the radial direction, with reference to this spindle, so as to place itself between the planet gear 12 and the planet carrier 13. This flange plate 43 comprises, at its outer end, a portion which is thicker in the axial direction in order to make it strong enough to be able to engage with the planet gear 12 or with the planet carrier 13 when one of these two elements is locked on the planet spindle 16. This thicker portion also has two planar faces which extend in the radial direction and which are therefore able to engage by friction with two corresponding planar faces located on the planet gear 12 and on the planet carrier 13, respectively.

Finally, this flange plate 43 is made of a shape memory material which causes a deformation of the flange plate when heated. In a normal mode of operation of the reduction gear, that is to say when the oil surrounding it is hot (around 150° C.), the flange plate assumes a conical shape, such that its outer end approaches and comes to press against the corresponding face of the planet carrier 13 and exerts against this face a force making them move as one. The planet spindle 16 then rotates as one with the planet carrier 13. This is the mode of operation shown in FIGS. 4 and 5, which is therefore analogous to the operation of the prior art in which the planet spindles 16 are rigidly attached to the planet carrier 13.

In contrast, when the environment in which the flange plate 43 is located cools down and/or when stopped, the flange plate recovers a substantially radial orientation and its outer end comes to press against the corresponding face of the planet gear 12. It exerts there a pressing force which makes the planet gear 12 move as one with its planet spindle 16. This is the mode of operation shown in FIGS. 6 and 7, which corresponds to a degraded mode of operation such as untimely engine shutdown. In this mode, the planet gear 12 is made to move as one with the planet spindle 16 and the journal bearing 15 located between them is neutralized.

Figure 6:
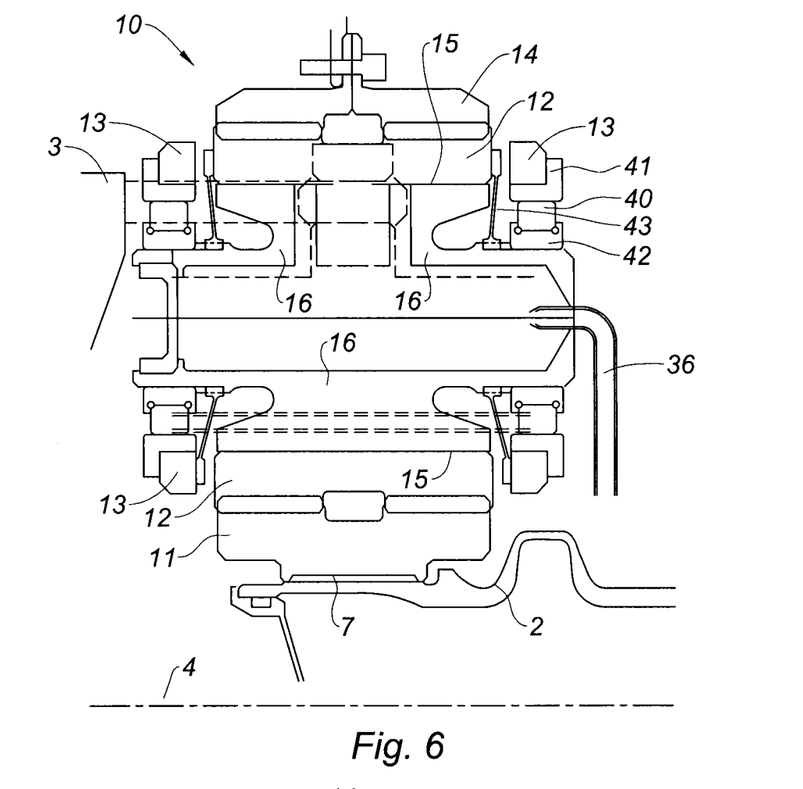
FIG. 6 is a view of a reduction gear with epicyclic gear train according to the invention, in a degraded mode of operation.
Figure 7:
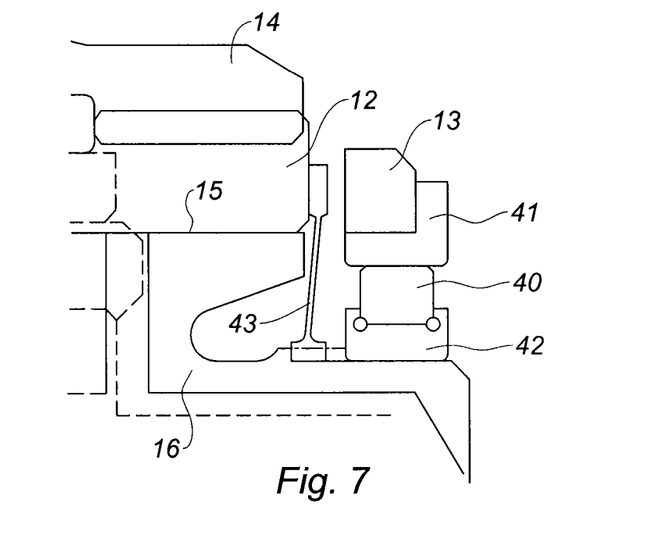
FIG. 7 is a detailed view of the reduction gear of FIG. 6.

It should be noted that, when the flange plate 43 is pressed tightly against the first face of the planet carrier 13, it will be able to act as a torque limiter in the event of a breakdown. This is because if the journal bearing 15 were to seize, for example as a consequence of a lubrication fault, the bearing would become locked in rotation and would transmit the torque from the planet gear 12 to the flange plate 43. As the capacity for uptake of this torque is limited by the coefficient of adhesion between the flange plate 43 and the planet carrier 13, the spindle 16 will in fact be able to rotate freely in the planet carrier 13, and the reduction gear will not be locked, thus limiting the negative consequences of this seizure.

DESCRIPTION OF THE PREFERRED EMBODIMENT

The operation of a reduction gear with epicyclic gear train, as proposed by the invention, in which the planet spindles 16 are mounted on the planet carrier through a rotary bearing and are fitted with a locking flange plate made of a shape memory material, will now be described.

The reduction gear has two operating modes, depending on the position imparted to the flange plate 43 and depending on the element against which it is pressing. Switching from one mode of operation to the other is carried out automatically, as a function of the ambient temperature in the reduction gear and, in particular, the temperature of its lubrication oil.

In what is termed normal operation, which corresponds to the operation of reduction gears of the prior art, having a single mode of operation, or to reduction gears according to the invention in the configuration shown in FIGS. 4 and 5, the lubrication oil is hot and the flange plate 43 presses against the planet carrier 13. The flange plate thereby makes the planet carrier 13 move as one with the planet spindle 16 which bears the flange plate, this giving rise to conventional operation of an epicyclic reduction gear having a fixed annulus gear 14.

In what is termed degraded operation, which corresponds to FIGS. 6 and 7, the lubrication oil is cold and the flange plate 43 presses against the planet gear 12. The flange plate thereby makes the planet gear 12 move as one with its planet spindle 16 and cancels the function of the journal bearing 15 between the planet gear 12 and the corresponding spindle 16. This degraded mode of operation is found, in the invention, at engine startup or after engine shutdown, when the lubrication oil is still cold.

Outside of these two modes which are normal modes of use, the degraded mode is found for example in the event of an in-flight engine shutdown, the reduction gear then no longer being supplied with lubrication oil.

In the degraded mode, whether at startup or when the engine is windmilling following in-flight shutdown, there is no flow of hot oil. The flange plates 43 of each of the planet spindles 16, on one hand, press tightly against the planet gears and put their journal bearings 15 out of service and, on the other hand, free up the planet carrier 13. The planet gears 12 then rotate as one with the planet spindles 16, to which they are mechanically linked, about the rotary bearings having rollers 40 instead of rotating about the spindles 16 as in normal operation.

In the event of a journal bearing 15 locking up, for example by seizure, the flange plates 43 act like a fuse, that is to say that they avoid the reduction gear locking up by providing simple tight pressing of limited amplitude, which tight pressing therefore does not prevent the spindle from rotating when the journal bearing has seized. The engine designer therefore no longer needs to provide for a back-up pump to be installed in order to maintain lubrication of the reduction gear in the event of in-flight engine shutdown.

The operation of the reduction gear during the various operational phases of the jet engine on which it is mounted will now be examined.

At engine startup, there is no oil in the reduction gear; the flange plates 43 are cold and are therefore pressed tightly against the rims of the planet gears 12. The flange plates lock the planet gears and make them move as one with their planet spindles 16, thus preventing any rotation about the corresponding journal bearings 15. This grouping formed by the planet gears 12 and their spindles 16 can, however, rotate freely about the rotary bearings having rollers 40, which allows the planet carrier 13, and consequently the fan shaft 3, to rotate. The reduction gear is therefore not locked, which would have prevented engine startup.

When the engine is in operation, the oil heats up the flange plates 43, which undergo deformation because of the shape memory of the material from which they are made. The flange plates free up the planet gears 12 and progressively press tightly against the rotary bearings having rollers 40. The journal bearings 15 located between the planet gears 12 and their spindles 16 are then free to move in rotation whereas the rotary bearings having rollers are locked by the radial end of the flange plate 43 engaging with the planet carrier 13. This results in the conventional operation of a reduction gear with epicyclic gear train, with planet gears 12 now rotating about planet spindles 16 which are immobile relative to the planet carrier 13.

In the event of untimely in-flight engine shutdown, the HP spool of the jet engine stops and no longer supplies hot oil to the reduction gear 10. The journal bearings 15 of the planet gears 12 progressively empty themselves of oil, with the associated risk of seizure, and the flange plates 43 are no longer kept at the correct temperature by this hot oil. The flange plates then cool down and, because of the shape memory of the material from which they are made, their radial end moves away from the planet carrier, thus freeing up the rotary bearings having rollers 40. The planet gears 12 which are no longer free to rotate about their journal bearings do, however, become free to rotate about these roller bearings.

As the capacity of the flange plates to take up torque is limited, if the journal bearings seize, the flange plates will slide against the wall of the planet carrier and allow the rolling bearings 42 to rotate. The reduction gear is therefore not locked, and the fan shaft 3 continues to rotate. The engine can windmill and not generate parasitic drag which would arise from the fan locking up.

This is because, in the event of the journal bearing 15 of a planet gear 12 seizing, for whatever reason other than in-flight shutdown of the engine, the planet gear 12 in question welds itself to its planet spindle 16. As the lubrication of the reduction gear continues, a priori, the radial end of the flange plate 43 remains pressed against the corresponding planar face of the planet carrier 13 and provides a torque opposed to the rotation of the planet carrier. However, as the connection between this radial end and the corresponding face consists only of simple pressure, the tight pressing remains moderate and cannot oppose the rotation of the planet carrier 13 and that of the reduction gear. The flange plate rubs against the corresponding face of the planet carrier without locking the reduction gear and the lubrication, which continues to function in the case in question, helps to remove the heat energy generated by this friction. This then constitutes a degraded mode in which the engine can continue to operate without the breakdown encountered on the reduction gear having an immediate and dangerous impact on the operation of the engine.

Finally, when the engine is shut down at the end of a flight, except in the case of a breakdown, the reduction gear empties itself of its oil and the flange plates 43 return to a conical shape as they cool, thus freeing up the planet carrier 13 and coming to press against the planar faces of the corresponding planet gears 12. By freeing up the planet carrier 13 and allowing it to rotate about the rotary bearings having rollers 40, the flange plates allow the reduction gear—and consequently the fan— to windmill when the engine is shut down on the apron. This configuration is in accordance with a conventional usage of the engine, which must be left free when on the ground in order to windmill when acted upon by any wind blowing on the apron.

As a final point, the invention is characterized by the addition of rotary bearings, for example in the form of rolling bearings having rollers 40, between the planet carrier 13 and the planet spindles 16 about which the planet gears 12 rotate. These subsidiary bearings can be brought into or out of operation using an actuation means such as the flange plate 43 described hereinabove, depending on the chosen mode of operation. It is then possible either to render these subsidiary bearings operational and allow the planet spindles 16 to rotate relative to the planet carrier 13, or to render them non-operational by locking them and allowing the planet gears 12 to rotate only about their planet spindles 16 which are then immobile relative to the planet carrier. This configuration is particularly suited to the case presented hereinabove, where the bearings 15 located between the planet gears 12 and their planet spindles 16 are journal bearings, which are therefore at risk of seizing.

The invention is furthermore noteworthy in that the means for locking the planet spindles 16 on the planet carrier 13 do not provide complete locking but one which can be overcome, by applying a high torque, in the event that the journal bearings seize when the actuation means 43 has not freed up the planet spindles 16. The case of the journal bearings seizing can therefore be covered whatever the position of the actuation means 43, that is to say whatever the mode of operation of the reduction gear with respect to the planet spindles being locked in rotation.

The invention proposes to manufacture the actuation means 43 in a shape memory material and to use the temperature of the oil circulating in the reduction gear as a control means for locking or unlocking. This solution has the advantage that the locking process can be triggered automatically and that the engine designer is not required to integrate a specific control device for the actuation means.

The advantages provided by this invention are thus that the invention proposes a simple and very lightweight system: as the rotary bearings introduced with respect to the prior art are engineered for small loads, they remain very compact. Moreover, the device operates with an automatic safety device which requires neither an actuator nor a specific control. Finally, the designer is not required to integrate a back-up pump for supplying oil to the journal bearings on which the planet gears of the epicyclic gear train rotate, in case these were to seize.

The invention claimed is:

1. A reduction gear with epicyclic gear train comprising:
an annulus gear; and
at least one planet gear rolling on said annulus gear and able to rotate about a planet spindle borne by a planet carrier, said planet spindle being mounted such that said planet spindle can itself rotate about its axis relative to said planet carrier,
wherein there are two modes of operation: a first mode in which said planet spindle is rigidly attached to the planet carrier and a second mode in which said planet spindle can rotate freely relative to the planet carrier.
2. The reduction gear as claimed in claim 1, wherein the planet gear rotates about its planet spindle by means of a journal bearing and the planet spindle is mounted on the planet carrier via a rolling bearing.

3. The reduction gear as claimed in claim 1, wherein switching from one mode to the other is performed as a function of temperature of lubrication oil of said reduction gear.

4. The reduction gear as claimed in claim 3, wherein switching from one mode to the other is actuated by an actuation means positioned so as to be in contact with said lubrication oil and comprising a shape memory material.

5. The reduction gear as claimed in claim 4, wherein said actuation means is a flange plate in a shape of a circular annulus, a central bore of which is attached to said spindle and an outer end of which moves in an axial direction as a function of the temperature of the lubrication oil.

6. The reduction gear as claimed in claim 5, wherein said flange plate comprises, at an outer end thereof, a first face which extends in a radial direction facing a first corresponding face positioned on said planet carrier, an axial positioning of said outer end, produced by the oil at a nominal operating temperature of the reduction gear, being designed so as to cause said first and first corresponding faces to press against each other.

7. The reduction gear as claimed in claim 5, wherein said flange plate comprises, at outer end thereof, a second face which extends in a radial direction facing a second corresponding face positioned on said planet gear, an axial positioning of said outer end, produced by the oil at a temperature below a nominal operating temperature of the reduction gear, being designed so as to cause said second and second corresponding faces to press against each other.

8. The reduction gear as claimed in claim 6, wherein said flange plate exerts sufficient pressure against a wall of the planet carrier such that, in the event of an overtorque as the result of the journal bearings seizing, the planet spindle can still rotate in order to prevent the reduction gear from locking up.

9. A fan module comprising a fan shaft driven by a reduction gear as claimed in claim 1.

10. A dual-flow jet engine comprising a fan module as claimed in claim 9.

\* \* \* \* \*